US011569006B1

(12) United States Patent
Przyojski et al.

(10) Patent No.: US 11,569,006 B1
(45) Date of Patent: Jan. 31, 2023

(54) COVER FOR A CABLE HARNESS WITH DIFFERENT COLOR LAYERS

(71) Applicant: tesa SE, Norderstedt (DE)

(72) Inventors: Jacob Przyojski, Howard City, MI (US); Andreas Meier, Grand Rapids, MI (US)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 17/407,505

(22) Filed: Aug. 20, 2021

(51) Int. Cl.
| | |
|---|---|
| *H01B 7/00* | (2006.01) |
| *H01B 7/36* | (2006.01) |
| *H01B 11/20* | (2006.01) |
| *H01B 3/42* | (2006.01) |
| *H01B 3/30* | (2006.01) |
| *H01B 7/18* | (2006.01) |

(52) U.S. Cl.
CPC ............. *H01B 7/361* (2013.01); *H01B 3/305* (2013.01); *H01B 3/421* (2013.01); *H01B 7/0045* (2013.01); *H01B 7/188* (2013.01); *H01B 11/206* (2013.01)

(58) Field of Classification Search
CPC .. H01B 7/0045; H01B 7/0208; H01B 7/0241; H01B 7/1855
See application file for complete search history.

(56) References Cited

U.S. PATENT DOCUMENTS

| | | | | |
|---|---|---|---|---|
| 7,282,250 B2 * | 10/2007 | Musahl | ...................... | C09J 7/21 |
| | | | | 174/105 R |
| 8,455,080 B2 * | 6/2013 | Baer | ........................ | B32B 5/024 |
| | | | | 428/36.1 |
| 9,064,618 B2 * | 6/2015 | Kuchta | ................... | H01B 7/361 |
| 9,555,749 B2 | 1/2017 | Kamijo et al. | | |
| 10,361,015 B1 | 7/2019 | Skidmore et al. | | |
| 2008/0261012 A1 | 10/2008 | Kopf et al. | | |
| 2014/0065377 A1 | 3/2014 | Horvath et al. | | |
| 2015/0024646 A1 | 1/2015 | Lodde et al. | | |

(Continued)

FOREIGN PATENT DOCUMENTS

| | | | |
|---|---|---|---|
| CN | 103881373 | * | 6/2014 |
| CN | 109698044 A | | 4/2019 |

(Continued)

OTHER PUBLICATIONS

Coroplast Fritz Müller GmbH & Co. KG, Technische Klebebänder Gesamtprogramm (Technical Adhesive Tapes Overall Program), Mar. 2019, 95 pages, Germany.

*Primary Examiner* — Chau N Nguyen
(74) *Attorney, Agent, or Firm* — Price Heneveld LLP (57) ABSTRACT

A cover for a cable harness including: (i) a first layer comprising a first color; (ii) a second layer layered adjacent to the first layer, the second layer comprising a second color that is different than the first color; and (iii) an adhesive layer adhered to the first layer, at least a portion of the adhesive is not covered by the second layer. The first color can black, while the second color is white. The second layer comprises fibers that can be substantially free of dye. At least one of the first layer and the second layer can be polyethylene terephthalate. The cover can cover a plurality of cables of a cable harness. If wear forms a hole through the first layer, the second color of the second layer is visible from an environment external to the covered cable harness through the hole through the first layer.

14 Claims, 5 Drawing Sheets

(56) References Cited

U.S. PATENT DOCUMENTS

| | | | |
|---|---|---|---|
| 2015/0170796 A1* | 6/2015 | Inao | B60R 16/0215 |
| | | | 174/72 A |
| 2017/0198173 A1* | 7/2017 | Frigge | C09J 9/00 |
| 2019/0315969 A1* | 10/2019 | Liao | C04B 35/571 |
| 2020/0056070 A1 | 2/2020 | Kutter et al. | |
| 2020/0335242 A1* | 10/2020 | Caperon | H01B 9/006 |
| 2021/0040355 A1 | 2/2021 | Hänle et al. | |

FOREIGN PATENT DOCUMENTS

| | | |
|---|---|---|
| CN | 110105891 A | 8/2019 |
| DE | 4209210 A1 | 9/1993 |
| DE | 29823462 U1 | 7/1999 |
| DE | 20306801 U1 | 7/2003 |
| DE | 102005060231 A1 | 6/2007 |
| DE | 102008056554 A1 | 5/2010 |
| DE | 102013107157 A1 | 1/2015 |
| DE | 102014107312 A1 | 1/2015 |
| DE | 102015121562 A1 | 6/2017 |
| DE | 102016124608 A1 | 7/2017 |
| DE | 202017107757 U1 | 3/2018 |
| DE | 102017219749 A1 | 5/2018 |
| DE | 202018101649 U1 | 5/2018 |
| DE | 202018103986 U1 | 8/2018 |
| DE | 202017105607 U1 | 1/2019 |
| EP | 0916710 A1 | 5/1999 |
| EP | 0994169 A2 | 4/2000 |
| EP | 1000992 A1 | 5/2000 |
| EP | 1074595 A1 | 2/2001 |
| EP | 1607459 A1 | 12/2005 |
| EP | 1862417 A1 | 12/2007 |
| EP | 2045303 A1 | 4/2009 |
| EP | 2546317 A1 | 1/2013 |
| EP | 2722374 A1 | 4/2014 |
| EP | 2821453 A1 | 1/2015 |
| EP | 2824153 A1 | 1/2015 |
| WO | 9833191 A1 | 7/1998 |
| WO | 9950943 A1 | 10/1999 |
| WO | 03054101 A1 | 7/2003 |
| WO | 2006058913 A1 | 6/2006 |
| WO | 2007017332 A1 | 2/2007 |
| WO | 2007017334 A1 | 2/2007 |
| WO | 2009133175 A1 | 11/2009 |
| WO | 2014037431 A1 | 3/2014 |
| WO | 2014039478 A2 | 3/2014 |
| WO | 2015149889 A1 | 10/2015 |
| WO | 2016113132 A1 | 7/2016 |
| WO | 2019002314 A1 | 1/2019 |
| WO | 2019101377 A1 | 5/2019 |
| WO | 2020011409 A1 | 1/2020 |

* cited by examiner

COVER FOR A CABLE HARNESS WITH DIFFERENT COLOR LAYERS

BACKGROUND

Some vehicles include cables for a variety of purposes, such as to conduct electricity, transfer data, and manipulate actuable components. Sometimes these cables are bundled together into a cable harness to minimize the space that the cables occupy and to reduce interaction of the cables with other components of the vehicle. Sometimes a cover covers the cable harness to protect the disparate cables from wear caused by contacting other components of the vehicle. Such wear could cause one or more of the cables to fail and, thus cause the vehicle to operate less optimally. However, there is a problem in that the cover sometimes contacts other components of the vehicle and eventually an area of the cover is abraded away, leaving one or more of the cables subject to contacting the other components and subsequently abrading until failure.

SUMMARY

The present disclosure addresses that problem with a cover for a cable harness that includes a first layer and a second layer disposed closer to the cable harness than the first layer. The second layer has a color that is different than a color of the first layer. In the event that other components of the vehicle removes a portion of the first layer, such as abrading the portion of the first layer, the second layer of the cover remains to protect the cable harness from abrasion. However, because the color of the second layer is different than the color of the first layer, the second layer is visible to a viewer external to the vehicle. The viewer sees the color of the second layer through the portion of the first layer that has been abraded away. The viewer thus then knows that remedial action can be taken to prevent the abrasion or to replace a worn portion of the cover, before the second layer and one or more of the cables are additionally abraded away, In short, the cover of the present disclosure has a built-in wear indicator that warns the viewer that abrasion of the cover is occurring long before abrasion causes failure of one or more cables of the cable harness.

According to a first aspect of the present disclosure a cover for a cable harness comprises: (i) a first layer comprising a first color; (ii) a second layer layered adjacent to the first layer, the second layer comprising a second color that is different than the first color; and (iii) an adhesive layer adhered to the first layer, at least a portion of the adhesive is not covered by the second layer.

According to a second aspect of the present disclosure, the first aspect is presented, wherein (i) the first color is black; and (ii) the second color is white.

According to a third aspect of the present disclosure, any one of the first through second aspects is presented, wherein the second color has CIELAB color space values within the following ranges: $L^*$, 70 to 100; $a^*$, −10 to 10; and $b^*$, −10 to 10.

According to a fourth aspect of the present disclosure, any one of the first through third aspects is presented, wherein the first color has CIELAB color space values within the following ranges: $L^*$, 0 to 30; $a^*$, −10 to 10; and $b^*$, −10 to 10.

According to a fifth aspect of the present disclosure, any one of the first through fourth aspects is presented, wherein the second layer comprises fibers that are substantially free of dye.

According to a sixth aspect of the present disclosure, any one of the first through fifth aspects is presented, wherein the second color, but not the first color, has CIELAB color space values within the following ranges: $L^*$, 70 to 100; $a^*$, −3 to 3; and $b^*$, −3 to 3.

According to a seventh aspect of the present disclosure, any one of the first through sixth aspects is presented, wherein the second color but not the first color, has CIELAB color space values within the following ranges: $L^*$, 80 to 100; $a^*$, −4 to 4; and $b^*$, −4 to 4.

According to an eighth aspect of the present disclosure, any one of the first through seventh aspects is presented, wherein the second color, but not the first color, has CIELAB color space values within the following ranges: V. 90 to 100; $a^*$, −6 to 6; and $b^*$, −6 to 6.

According to a ninth aspect of the present disclosure, any one of the first through eighth aspects is presented, wherein at least one of the first layer and the second layer comprises polyethylene terephthalate.

According to a tenth aspect of the present disclosure, any one of the first through ninth aspects is presented, wherein at least one of the first layer and the second layer comprise a polyamide.

According to an eleventh aspect of the present disclosure, a covered cable harness comprises: (I) a plurality of cables; and (H) a cover covering at least a portion of the plurality of cables, the cover comprising: (a) a first layer comprising a first color, an outer surface facing away from the plurality of cables, and an inner surface facing toward the plurality of cables; and (b) a second layer layered adjacent to the first layer and facing the inner surface of the first layer, the second layer (i) disposed radially closer to the plurality of cables than the first layer and (ii) comprising a second color that is different than the first color.

According to a twelfth aspect of the present disclosure, the eleventh aspect is presented, wherein (i) the cover further comprises an adhesive adhered to the inner surface of the first layer; and (ii) at least a portion of the adhesive is not covered by the second layer and is adhered to the inner surface of the first layer to at least partially secure the cover around the plurality of cables.

According to a thirteenth aspect of the present disclosure, any one of the eleventh through twelfth aspects is presented, wherein (i) the first layer further comprises a hole; and (ii) the second color of the second layer is visible from an environment external to the covered cable harness through the hole through the first layer.

According to a fourteenth aspect of the present disclosure, any one of the eleventh through thirteenth aspects is presented, wherein (i) the first color is black; and (ii) the second color is white.

According to a fifteenth aspect of the present disclosure, any one of the eleventh through fourteenth aspects is presented, wherein the second color has CIELAB color space values within the following ranges: $L^*$, 70 to 100; $a^*$, 40 to 10; and $b^*$, 40 to 10.

According to a sixteenth aspect of the present disclosure, any one of the eleventh through fifteenth aspects is presented, wherein the first color has CIELAB color space values within the following ranges: $L^*$, 0 to 30; $a^*$, 40 to 10; and $b^*$, 40 to 10.

According to a seventeenth aspect of the present disclosure, any one of the eleventh through sixteenth aspects is presented, wherein the second color, but not the first color, has CIELAB color space values within the following ranges: $L^*$, 80 to 100; $a^*$, −4 to 4; and $b^*$, −4 to 4.

According to a eighteenth aspect of the present disclosure, any one of the eleventh through seventeenth aspects is presented, wherein the second color, but not the first color, has CIELAB color space values within the following ranges: L*, 90 to 100; a*, −6 to 6; and b*, −6 to 6.

According to a nineteenth aspect of the present disclosure, any one of the eleventh through eighteenth aspects is presented, wherein the second layer comprises fibers that are substantially free of dye.

According to a twentieth aspect of the present disclosure, any one of the eleventh through nineteenth aspects is presented, wherein at least one of the first layer and the second layer comprise polyethylene terephthalate or a polyamide.

DETAILED DESCRIPTION

Figure 1A:
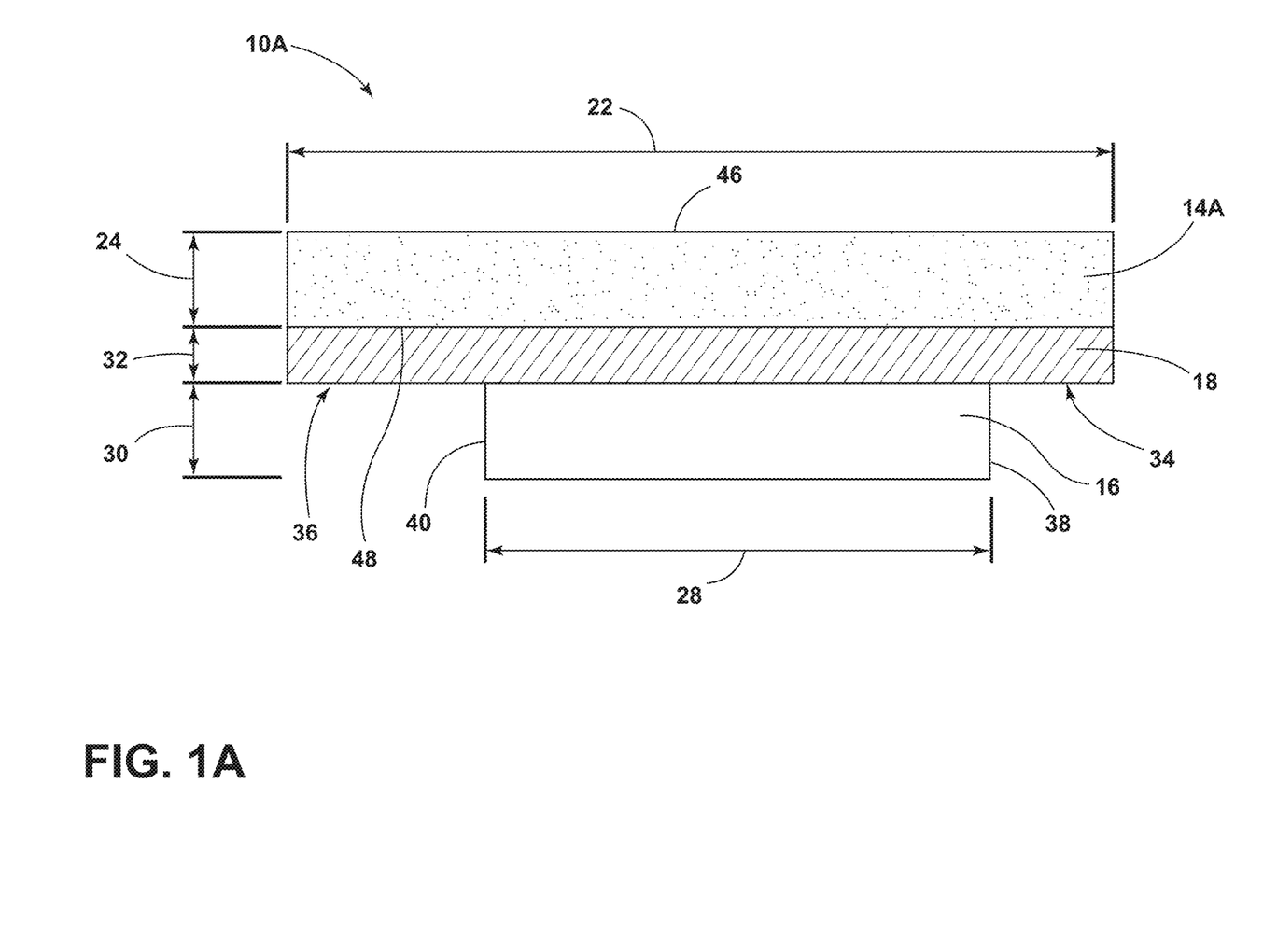
FIG. 1A is an elevation view of an embodiment of a cover for a cable harness of the present disclosure, illustrating a second layer disposed adjacent to a first layer and an adhesive layer disposed between the second layer and the first layer with portions of the adhesive layer left uncovered in order to adhere the cover around the cable harness.

Referring to FIG. 1A, a cover 10A for a cable harness 12 includes a first layer 14A, a second layer 16, and an adhesive layer 18. The second layer 16 is layered adjacent to the first layer 14A. The first layer 14A and the second layer 16 are sheets of material. The first layer 14A has a length 20 (representing essentially the length 20 of the cover 10A) and a width 22 greater than a thickness 24 thereof. Likewise, the second layer 16 has a length 26 (typically coextensive with the length 20 of the first layer 14A) and a width 28 greater than a thickness 30 thereof. The adhesive layer 18 is adhered to the first layer 14A. In embodiments, the adhesive layer 18 is applied with a thickness 32 on the first layer 14A, and the second layer 16 is then applied over the adhesive layer 18, thus adhering the first layer 14A and the second layer 16 together. The second layer 16 can additionally or alternatively be sewn to the first layer 14A.

The second layer 16 does not cover at least a first portion 34 of the adhesive layer 18. In embodiments, the second layer 16 does not cover at least a second portion 36 of the adhesive layer 18. In those embodiments, the width 28 of the second layer 16 is narrower than the width 22 of the first layer 14A, and second layer 16 is layered offset relative to the first layer 14A so that the first portion 34 of the adhesive layer 18 remaining exposed is disposed to one side 38 of the second layer 16 and the second portion 36 of the adhesive layer 18 remaining exposed is disposed to another side 40 of the second layer 16. The one side 38 and the other side 40 generally face in opposite directions.

Figure 1B:
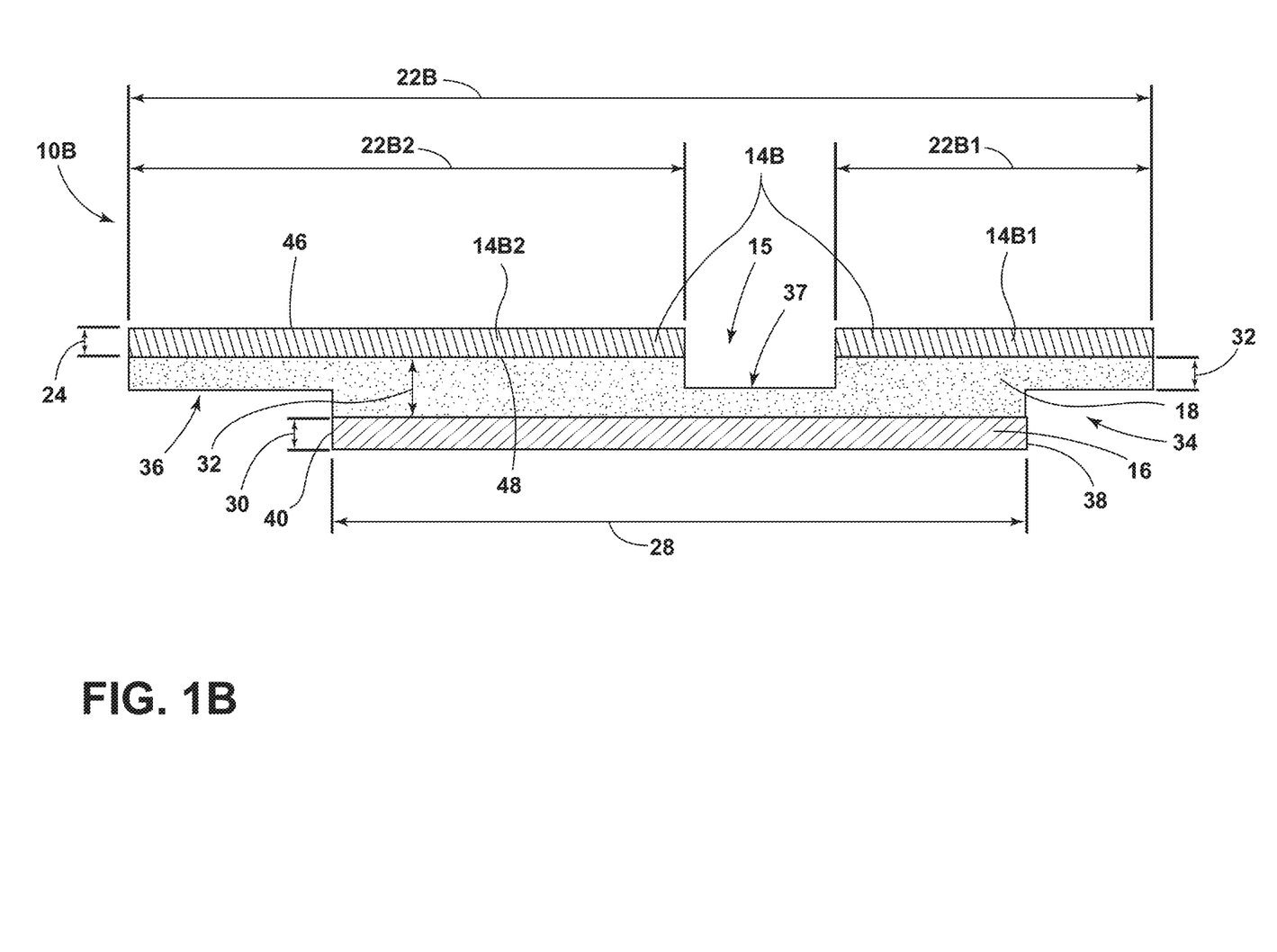
FIG. 1B is an elevation view of another embodiment of a cover for a cable harness of the present disclosure, illustrating a second layer disposed adjacent a first layer, which is bifurcated into a first portion and a second portion, and an adhesive layer disposed between the second layer and the first layer, with portions of the adhesive layer left uncovered by both the first layer and the second layer.

Referring to FIG. 1B, another embodiment of a cover 10B for the cable harness 12 is herein described. The cover 10B includes a first layer 14B, the second layer 16, and the adhesive layer 18 like the cover 10A of FIG. 1A. However, the first layer 14B of the cover 10B is bifurcated into a first portion 14B1 and a second portion 14B2. A gap 15 separates the first portion 14B1 and the second portion 14B2. The bifurcation of the first layer 14B into the first portion 14B1 and the second portion 14B2 leaves a third portion 37 of the adhesive layer 18 exposed at the side of the first layer 14B between the first portion 14B1 and the second portion 14B2. The first portion 14B1 has a width 22B1. The second portion 14B2 has a width 22B2. In embodiments, the width 22B2 of the second portion 14B2 is greater than the width 22B1 of the first portion 14B1. The width 22B1 and the width 22B2 span across a width 22B of the first layer 14B. In embodiments, adhesive is applied to the first portion 14B1, the second portion 14B2, and the second layer 16. Then the first portion 14B1 with adhesive and the second portion 14B2 with adhesive are applied to the second layer 16 with adhesive, with the gap 15 separating the first portion 14B1 and the second portion 14B2. The adhesives from the first portion 14B1, the second portion 14B2, and the second layer 16 collectively form the adhesive layer 18 of the cover 10B. The first portion 14B1 is applied to the second layer 16 so that the first portion 14B1 overhangs the second layer 16 leaving the first portion 34 of the adhesive layer 18 exposed. The second portion 14B2 is applied to the second layer 16 so that the second portion 14B2 overhangs the second layer 16 leaving the second portion 36 of the adhesive layer 18 exposed. The gap 15 in the first layer 14B exposing the third portion 37 of the adhesive layer 18 is disposed above the second layer 16. The cover 10B is otherwise the same as the cover 10A, and like numbers refer to like features.

Figure 2:
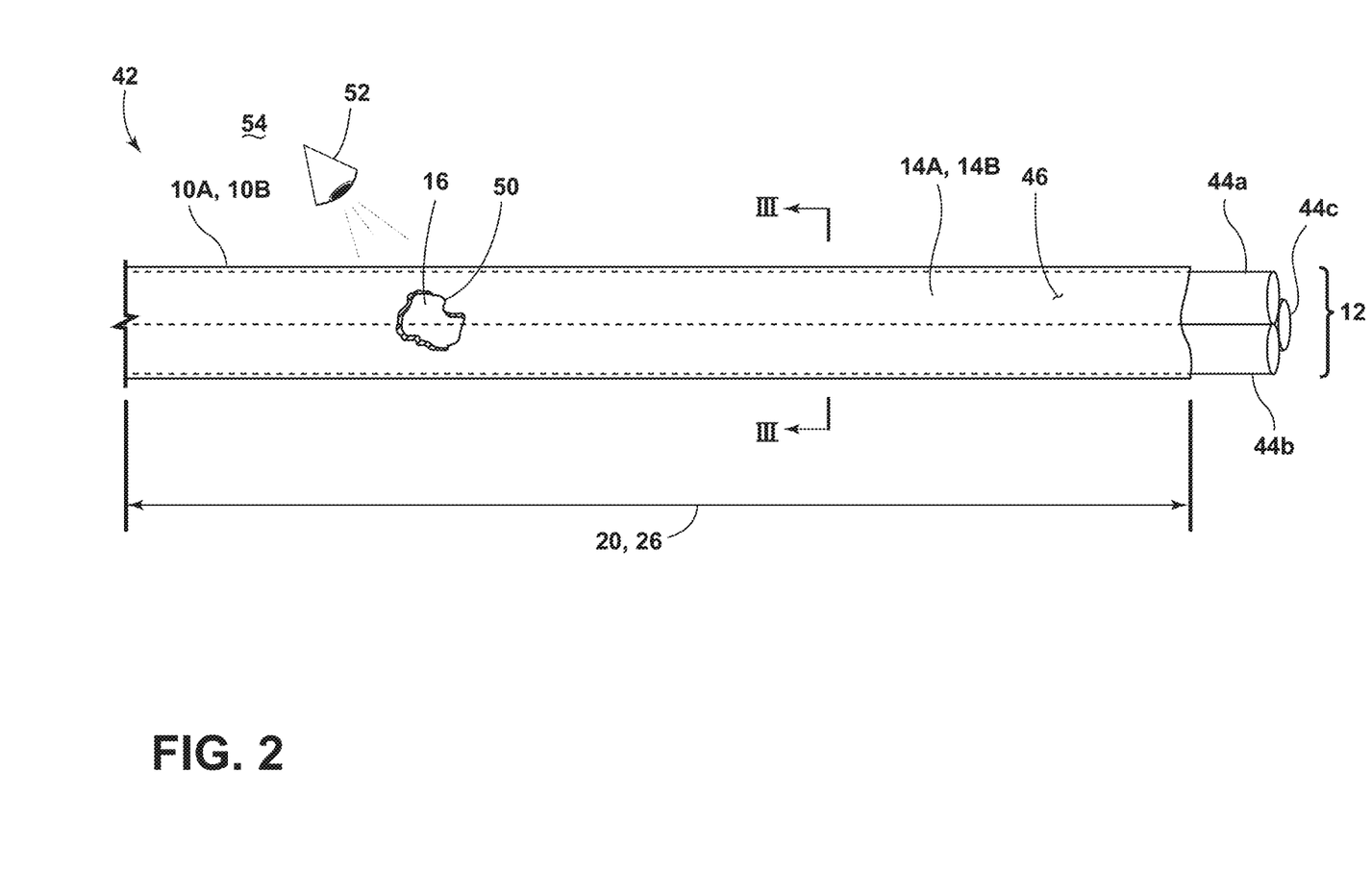
FIG. 2 is a slight perspective view of a covered cable harness with the cover of FIG. 1A covering a plurality of cables of the cable harness in a lengthwise, longitudinal, fashion, illustrating a hole disposed through the first layer (such as caused by something abrading the first layer away) thus making the second layer visible through the first layer.
Figure 3A:
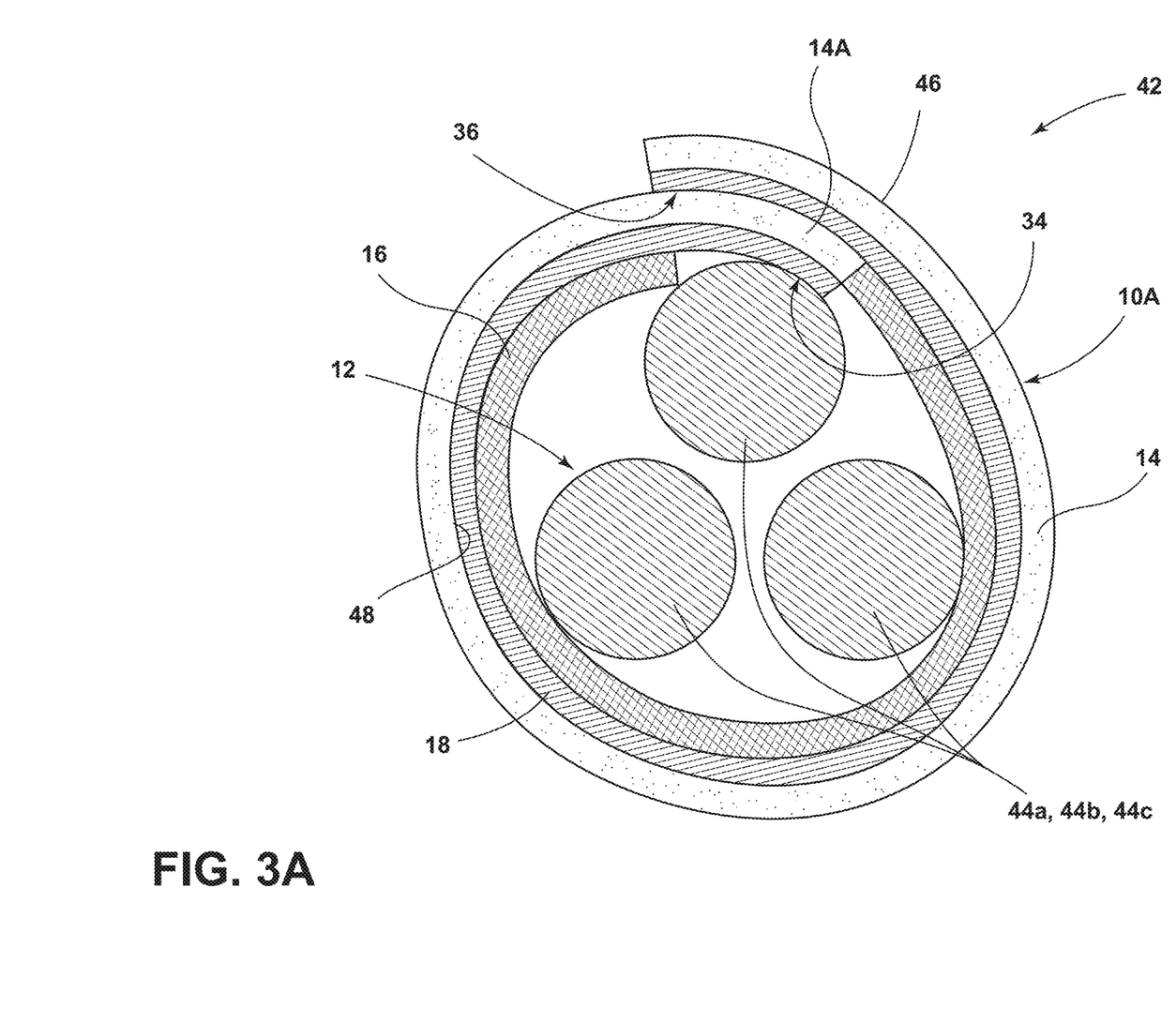
FIG. 3A is an elevation view of a cross-section of the covered cable harness of FIG. 2 taken through line Ill-Ill of FIG. 2, illustrating one of the portions of the adhesive layer left uncovered by the second layer overlapping an outer surface of the first layer thus adhering the cover of FIG. 1A to itself to secure the cover around the cable harness.
Figure 3B:
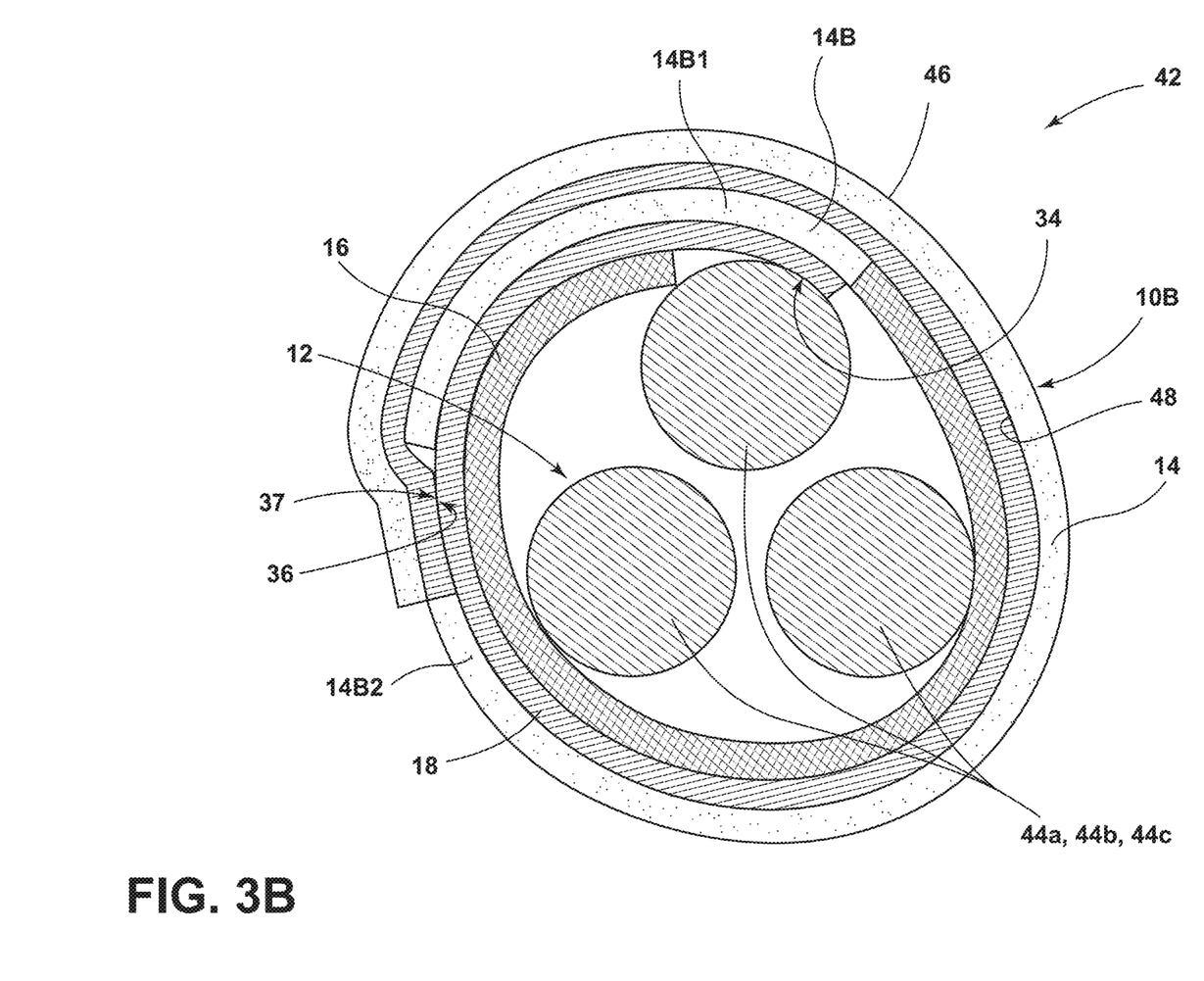
FIG. 3B is an elevation view like FIG. 3A but with the cover of FIG. 1B covering at least a portion of the plurality of cables.

Referring now additionally to FIGS. 2, 3A, and 3B, a covered cable harness 42 includes the cable harness 12, which includes a plurality of cables 44a, 44b, 44c, . . . 44n. The cover 10A (FIG. 3A) or the cover 10B (FIG. 3B) covers at least a portion of the plurality of cables 44a, 44b, 44c, . . . 44n. The first layer 14A, 14B has an outer surface 46 that faces away from the plurality of cables 44a, 44b, 44c, . . . 44n. In addition, the first layer 14A, 14B has an inner surface 48 that faces toward the plurality of cables 44a, 44b, 44c, . . . 44n. The adhesive layer 18 is adhered to the inner surface 48 of the first layer 14A, 14B. The second layer 16 faces the inner surface 48 of the first layer 14A, 14B. The second layer 16 is disposed radially closer the plurality of cables 44a, 44b, 44c, . . . 44n than the first layer 14A, 14B, when a radius would extend through all of the second layer 16, the adhesive layer 18, and the first layer 14A, 14B.

The adhesive layer 18 at least partially secures the cover 10A, 10B around the plurality of cables 44a, 44b, 44c, . . . 44n. As illustrated at FIGS. 3A, 3B, the width 22 of the first layer 14A, 14B is wrapped radially around the plurality of cables 44a, 44b, 44c, . . . 44n with the second layer 16 facing the plurality of cables 44a, 44b, 44c, . . . 44n. The first portion 34 of the adhesive layer 18 that is not covered by the second layer 16 adheres to one or more cables of the plurality of cables 44a, 44b, 44c, . . . 44n. With the cover 10A of FIG. 3A, the second portion 36 of the adhesive layer 18 that is not covered by the second layer 16 overlaps the first layer 14A and adheres to the outer surface 46 of the first layer 14A, thus securing the cover 10A radially around the plurality of cables 44a, 44b, 44c, . . . 44n throughout the length 20 of the cover 10A. With the cover 10B of FIG. 3B, the second portion 36 of the adhesive layer 18 that is not covered by the second layer 16 overlaps the first layer 14B and adheres to one or more of (I) the outer surface 46 of the first layer 14B and (ii) the third portion 37 of the adhesive layer 18, thus securing the cover 10B radially around the plurality of cables 44a, 44b, 44c, . . . 44n throughout the length 20 of the cover 10B.

The first layer 14A, 14B has a first color. The second layer 16 has a second color. The second color is different than the first color.

During use something contacts the covered cable harness 42 and creates a hole 50 through the first layer 14A, 14B to the second layer 16. Because the second layer 16 is the second color, which is different than the first color of the first layer 14A, 14B, a person 52 in an environment 54 external to the covered cable harness 42 can see that the hole 50 exists. More particularly, the person 52 sees the second color of the second layer 16 through the hole 50 through the first layer 14A, 14B. The person 52 then deduces that the first layer 14A, 14B has the hole 50. The person 52 thus knows that something is causing the covered cable harness 42 to wear. The person 52 can then take remedial action to prevent the wear, replace the covered cable harness 42, or both, before the something wears entirely through the cover 10A, 10B to one or more of the plurality of cables 44a, 44b, 44c, . . . 44n. The cover 10A, 10B thus operates as a wear indicator and warns of potential failure of the plurality of cables 44a, 44b, 44c, . . . 44n before such failure occurs.

In embodiments, the second color of the second layer 16 is white. In embodiments, the second color has CIELAB color space values within following ranges: $L^*$, 70 to 100; $a^*$, −10 to 10; and $b^*$, −10 to 10. In embodiments, the second color has CIELAB color space values within following ranges: $L^*$, 70 to 100; $a^*$, −3 to 3; and $b^*$, −3 to 3, In embodiments, the second color has CIELAB color space values within the following ranges: $L^*$, 80 to 100; $a^*$, −4 to 4; and $b^*$, −4 to 4. In embodiments, the second color has CIELAB color space values within the following ranges: $L^*$, 90 to 100; $a^*$, −6 to 6; and $b^*$, −6 to 6. In embodiments, while the second color has CIELAB color space values within any of the aforementioned ranges, the first color of the first layer 14A, 143 does not have CIELAB color space values within the same ranges. In other words while the second color has CIELAB color space values within any of the aforementioned ranges, the first color of the first layer 14A, 143 has CIELAB color space values outside of the same ranges.

In embodiments, the second layer 16 comprises fibers that are substantially free of dye. In embodiments, the second layer 16 comprises fibers that are substantially free of dye and formed from recycled polymer(s). In embodiments, the second layer 16 comprises fibers that are substantially free of dye and formed from recycled polyethylene terephthalate.

In embodiments, the first color of the first layer 14A, 143 is black. In embodiments the first color has CIELAB color space values within the following ranges: $L^*$, 0 to 30; $a^*$, 40 to 10; and $b^*$, 40 to 10. In embodiments, the first color has CIELAB color space values within the following ranges: $L^*$, 0 to 20; $a^*$, −20 to 20; and $b^*$, −20 to 20. In embodiments, the first color has CIELAB color space values within the following ranges: $L^*$, 0 to 10; and any value for $a^*$ and $b^*$.

In embodiments, either one or both the first layer 14A, 143 and the second layer 16 comprise a polymeric or organic textile. The textile can be woven or non-woven. In embodiments where the textile is polymeric, the textile can comprise a polyester such as polyethylene terephthalate, a polyamide, a polyolefin, or a combination of those polymers. The textile can further include fillers, reinforcements, and the like such as glass fibers carbon fibers or other high elastic modulus polymeric fibers. The textile can be considered to be a cloth, a velour, or a fleece. In embodiments, the first layer 14A, 143 comprises a polyamide textile, while the second layer 16 comprises a polyethylene terephthalate textile. In embodiments, the first layer 14A, 143 comprises a polyamide textile, while the second layer 16 comprises a textile characterized as velour.

In embodiments, the first layer 14A, 14B and the second layer 16 comprise different polymeric or organic textiles. Without being bound by theory, it is believed that the utilization of different materials for the first layer 14A, 14B and the second layer 16 imbues the cover 10A, 103 with improved abrasion resistance and sound damping than if the first layer 14A, 143 and the second layer 16 utilized identical materials.

In embodiments, the polymeric textiles of the first layer 14A, 14B and the second layer 16 are configured to have certain densities (also referred to herein as "basis weight"). In embodiments, the basis weight of the first layer 14A, 14B and the second layer 16 is within a range of 50 g/m² to 1000 g/m². In embodiments, the basis weight of the first layer 14 and the second layer 16 is 50 ern', 100 g/m², 200 g/m², 300 g/m², 400 g/m², 500 g/m², 600 g/m², 700 g/m², 800 g/m², 900 g/m², or 1000 g/m², or within any range defined by any two of those values (e.g., 100 g/m² to 500 g/m², 300 g/m² to 700 g/m²). In embodiments of the cover 10A, 10B, the basis weight of the first layer 14A, 14B is within a range of 100 g/m² to 400 g/m², while the basis weight of the second layer 16 is within a range of 50 g/m² to 250 g/m².

In embodiments, the thicknesses 24, 30 of the first layer 14A, 14B and the second layer 16 are each within a range of 50 μm to 2000 μm. In embodiments, the thicknesses 24, 30 of the first layer 14A, 14B and the second layer 16 are 50 μm, 100 μm, 200 km, 300 km, 400 μm, 500 μm, 600 μm, 700 μm, 800 μm, 900 μm, 1000 μm, 1100 μm, 1200 μm, 1300 μm, 1400 μm, 1500 μm, 1600 μm, 1700 μm, 1800 μm, 1900 μm, or 2000 μm, or within any range defined by any two of those values (e.g., 100 μm to 500 μm, 300 μm to 1400 μm, etc.). In embodiments, the thickness 24 of the first layer 14A, 14B is within a range of 150 μm to 350 μm, while the thickness 30 of the second layer 16 is 150 μm to 600 μm.

In embodiments, the adhesive layer 18 is or comprises an acrylate-based adhesive, an acrylate-based adhesive, a polyacrylate-based adhesive, a silicone-based adhesive, a rubber-based adhesive, a natural rubber-based adhesive or a combination of these adhesives. In embodiments, the adhesive layer 18 is a pressure-sensitive adhesive. In embodiments, the pressure-sensitive adhesive is made from: (a) 70.0 to 90.0 wt % of n-butyl acrylate and/or 2-ethylhexyl acrylate; (b) 10.0 to 20.0 wt % of one or more ethylenically unsaturated monomers, where at least 50.0 wt % of the ethylenically unsaturated monomers (monomer (b)) comprises methyl methacrylate; (c) 0 to 10.0 wt % of a further ethylenically unsaturated monomer, different from monomer (b); and (d) 0 to 5.0 wt % of an ethylenically unsaturated monomer having an acid or acid-anhydride function.

In embodiments, the cover 10A, 10B further comprises a backing layer (not illustrated) disposed over the first portion 34 and the second portion 36 of the adhesive layer 18. The backing layer can comprise one or more polymeric materials such as polyvinyl chloride (PVC), polyethylene, polypropylene, and polyester.

As mentioned, in embodiments, the adhesive layer 18 comprises the thickness 32. In embodiments, the thickness 32 of the adhesive layer 18 is within a range of 50 µm to 1000 µm. In embodiments, the thickness 32 of the adhesive layer 18 is 50 µm, 100 µm, 200 µm, 300 µm, 400 µm, 500 µm, 600 µm, 700 µm, 800 µm, 900 µm, or 1000 µm, or within any range defined by any two of those values (e.g., 100 µm to 800 µm, 200 µm to 300 µm, etc.).

According to some embodiments, the cover 10A, 10B is characterized by an abrasion resistance of at least 1000 abrasion strokes according to the LV 312 Standard, "Adhesive tapes for cable sets in motor vehicles" (January 2005), employed by various automakers (e.g., Audi, BMW, Volkswagen, etc.) ("LV 312 Standard"), and as measured by the ISO 6722 Standard. In embodiments, the According to an embodiment, the cover 10A, 10B is characterized by an abrasion resistance of Class D (1000-4999 abrasion strokes), Class E (5000-14999 abrasion strokes), Class F (15000-29999 abrasion strokes), or Class G (≥30000 abrasion strokes), according to the LV 312 Standard, and as measured by the ISO 6722 Standard. More particularly, abrasion is tested according to the ISO 6722 Standard by scraping a mandrel with a diameter of 5 mm across a multilayer tape sample until failure of the sample. Each scrape back and forth is defined as a stroke and can be grouped according to various Classes (e.g., Class A, Class B, etc.), according to the LV 312 Standard. Further, unless otherwise noted, all abrasion resistance values reported in this disclosure refer to an average number of abrasion strokes before failure for a particular sample configuration.

In embodiments, the cover 10A, 10B is characterized by a sound damping of at least 2 dB according to the LV 312 Standard. Further, in some aspects, the sound damping of the multilayer wrap 100 can be characterized as being in Class B, Class C, Class D, or Class E, according to the LV 312 Standards. In embodiments, the cover 10A, 10B is characterized by a sound damping of 2 dB, 3 dB, 4 dB, 5 dB, 10 dB, 15 dB, 20 dB, 25 dB, 30 dB, 35 dB, 40 dB, 45 dB, or 50 dB, or within a range defined by any two of those values (e.g., 4 dB to 35 dB, 20 dB to 50 dB, etc.), as measured according to the LV 312 Standard. As used herein, "sound damping" is measured according to the LV 312 Standard, and referenced in that standard as "acoustic insulation" or "noise attenuation".

What is claimed is:

1. A cover for a cable harness comprising:
   a first layer comprising a first color;
   a second layer layered adjacent to the first layer, the second layer comprising a second color that is different than the first color; and
   an adhesive layer adhered to the first layer, at least a portion of the adhesive layer is not covered by the second layer;
   wherein, the first color is black, the second color is white, and the second color has CIELAB color space values within the following ranges: L*, 70 to 100; a*, −10 to 10; and b*, −10 to 10; and
   wherein, the second layer comprises fibers that are substantially free of dye.

2. The cover of claim 1, wherein
   the first color has CIELAB color space values within the following ranges:
   L*, 0 to 30;
   a*, −10 to 10; and
   b*, −10 to 10.

3. The cover of claim 1, wherein
   the second color, but not the first color, has CIELAB color space values within the following ranges:
   L*, 70 to 100;
   a*, −3 to 3; and
   b*, −3 to 3.

4. The cover of claim 1, wherein
   the second color, but not the first color, has CIELAB color space values within the following ranges:
   L*, 80 to 100;
   a*, −4 to 4; and
   b*, −4 to 4.

5. The cover of claim 1, wherein
   the second color, but not the first color, has CIELAB color space values within the following ranges:
   L*, 90 to 100;
   a*, −6 to 6; and
   b*, −6 to 6.

6. The cover of claim 1, wherein
   at least one of the first layer and the second layer comprises polyethylene terephthalate.

7. The cover of claim 1, wherein
   at least one of the first layer and the second layer comprises a polyamide.

8. A covered cable harness comprising:
   a plurality of cables; and
   a cover covering at least a portion of the plurality of cables, the cover comprising:
      a first layer comprising a first color, an outer surface facing away from the plurality of cables, and an inner surface facing toward the plurality of cables; and
      a second layer layered adjacent to the first layer and facing the inner surface of the first layer, the second layer (i) disposed radially closer to the plurality of cables than the first layer and (ii) comprising a second color that is different than the first color;
   wherein, the first color is black, the second color is white, and the second color has CIELAB color space values within the following ranges: L*, 70 to 100; a*, −10 to 10; and b*, −10 to 10; and
   wherein, the second layer comprises fibers that are substantially free of dye.

9. The covered cable harness of claim 8, wherein
   the cover further comprises an adhesive adhered to the inner surface of the first layer; and
   at least a portion of the adhesive is not covered by the second layer and is adhered to the inner surface of the first layer to at least partially secure the cover around the plurality of cables.

10. The covered cable harness of claim 8, wherein
    the first layer and the second layer are layered such that, upon formation of a hole through the first layer from abrasion,
    the second color of the second layer is visible from an environment external to the covered cable harness through the hole through the first layer.

11. The covered cable harness of claim 8, wherein
    the first color has CIELAB color space values within the following ranges:
    L*, 0 to 30;
    a*, −10 to 10; and
    b*, −10 to 10.

12. The covered cable harness of claim 8, wherein
the second color, but not the first color, has CIELAB color
  space values within the following ranges:
  $L^*$, 80 to 100;
  $a^*$, −4 to 4; and
  $b^*$, −4 to 4.
13. The covered cable harness of claim 8, wherein
the second color, but not the first color, has CIELAB color
  space values within the following ranges:
  $L^*$, 90 to 100;
  $a^*$, −6 to 6; and
  $b^*$, −6 to 6.
14. The covered cable harness of claim 8, wherein
at least one of the first layer and the second layer comprise
  polyethylene terephthalate or a polyamide.

\* \* \* \* \*

UNITED STATES PATENT AND TRADEMARK OFFICE
CERTIFICATE OF CORRECTION

PATENT NO. : 11,569,006 B1
APPLICATION NO. : 17/407505
DATED : January 31, 2023
INVENTOR(S) : Przyojski et al.

It is certified that error appears in the above-identified patent and that said Letters Patent is hereby corrected as shown below:

In the Specification

Column 2;
Line 14;
"V." should be —$L^*$—.
Line 27;
"(H)" should be —(II)—.
Line 56;
"40" should be — -10—.
Line 57;
"40" should be — -10—.
Line 61;
"40" should be — -10—.
Line 62;
"40" should be — -10—.

Column 5;
Line 50;
"143" should be —14B—.
Line 54;
"143" should be —14B—.
Line 62;
"143" should be —14B—.
Line 64;
"40" should be — -10—.
Line 65;
"40" should be — -10—.

Signed and Sealed this
Thirteenth Day of February, 2024

Katherine Kelly Vidal
*Director of the United States Patent and Trademark Office*

CERTIFICATE OF CORRECTION (continued)
U.S. Pat. No. 11,569,006 B1

Column 6;
Line 4;
"143" should be —14B —.
Line 14;
"143" should be —14B—.
Line 16;
"143" should be —14B—.
Line 23;
103" should be —10B—.
Line 25;
"143" should be —14B—.
Line 33;
"em'" should be —g/m$^2$—.
Line 45;
"200 km, 300 km" should be —200 μm, 300 μm—.

In the Claims

Column 8;
Claim 10, Line 58;
There should be no new paragraph after "abrasion,".

Column 9;
Claim 14, Line 14;
"comprise" should be —comprises—.